United States Patent
Fox

[11] 3,855,277
[45] Dec. 17, 1974

[54] FLAME RETARDANT COMPOUNDS AND THERMOPLASTIC COMPOSITIONS CONTAINING THE SAME

[75] Inventor: Daniel W. Fox, Pittsfield, Mass.

[73] Assignee: General Electric Company, Pittsfield, Mass.

[22] Filed: Nov. 1, 1971

[21] Appl. No.: 194,518

[52] U.S. Cl............ 260/45.7 R, 260/13, 260/40 R, 260/45.75 B, 260/47 XA, 260/860, 260/862, 260/DIG. 24
[51] Int. Cl.............................................. C08g 39/02
[58] Field of Search.......... 260/13, 45.7 R, 45.75 B, 260/47 XA, 40 R, 860, 463, DIG. 24, 862

[56] References Cited
UNITED STATES PATENTS

| | | | |
|---|---|---|---|
| 3,028,365 | 4/1962 | Schnell et al. | 260/463 |
| 3,267,070 | 8/1966 | Tousignant et al. | 260/463 |
| 3,365,517 | 1/1968 | Barth | 260/47 |
| 3,382,207 | 5/1968 | Jaquiss | 260/463 |
| 3,431,224 | 3/1969 | Goldblum | 260/860 |
| 3,624,024 | 11/1971 | Caldwell | 260/46.75 |
| 3,647,747 | 3/1972 | Bialous | 260/45.7 |
| 3,668,155 | 6/1972 | Raley, Jr. | 260/45.75 |
| 3,671,487 | 6/1972 | Abolins | 260/40 |
| 3,688,001 | 8/1972 | Exner et al. | 260/45.7 |

*Primary Examiner*—Donald E. Czaja
*Assistant Examiner*—E. C. Rzucidlo
*Attorney, Agent, or Firm*—William F. Mufatti, Esq.; George B. Finnegan, Jr.; Rocco S. Barrese

[57] ABSTRACT

There are provided low molecular weight poly(-halogenated dihydric phenol carbonates), which are efficient flame retardant agents for flammable thermoplastic resins, including those with high ignition temperatures. Illustratively, aromatic polycarbonate, poly(alkylene terephthalate), acrylonitrile-butadiene-styrene, and polyphenylene ether thermoplastic resins are rendered self-extinguishing by incorporation of a low molecular weight polymer of a carbonate of tetrabromobisphenol-A, chain-stopped with tribromophenol.

12 Claims, No Drawings

FLAME RETARDANT COMPOUNDS AND THERMOPLASTIC COMPOSITIONS CONTAINING THE SAME

This invention relates to new and novel flame retardant compounds and in particular to thermoplastic compositions containing them. More particularly, it is concerned with novel low polymers of carbonates of halogenated dihydric phenols and flame retardant combinations thereof with normally flammable thermoplastic resins.

BACKGROUND OF THE INVENTION

The use of certain additives for the purpose of reducing the flammability of various thermoplastic polymers is well known to those skilled in the art. Flame retardant thermoplastic compositions are desired for many fields of use, such as in home construction, automobile and aircraft manufacture, packaging, electrical equipment, and the like.

Many thermoplastics ignite at relatively low temperatures and others have high ignition temperatures. Among the former can be mentioned polystyrene, polyethylene, cellulose esters, e.g., cellulose acetate and cellulose nitrate, and polyesters, e.g., poly(ethylene terephthalate). These resins are generally regarded to be highly flammable. On the other hand, some thermoplastics, such as the aromatic polycarbamates, polyphenylene ethers, polysulfones, polybenzimidazoles, polyamides, and the like ignite at temperatures far in excess of the others, e.g., at above 700°F., or so. Although not considered to be highly flammable, they still are potentially dangerous unless rendered flame retardant. For convenience, all such resins will be classified herein as "normally flammable" because, although there is a high ignition temperature, a polycarbonate, for example, can support combustion beyond 20 seconds after ignition and subsequent removal of the igniting source and in particular, burning is seen in thin sections.

It is therefore desirable to provide compositions which will not support combustion beyond a few seconds, both for the highly flammable resins, but in particular, even for those of high ignition temperature.

In the art of rendering thermoplastic resins flame retardant, many materials have been used as flame retardant additives. Many of the additives are halogen containing compounds and these have been fairly successful in accomplishing the desired result, but at some sacrifice in physical properties in parts molded from the compositions. Often, however, increasing the amounts of conventional halogenated flame retardant compounds has an undesirable plasticizing effect on the normally rigid molded parts. In addition, especially with the high ignition temperature thermoplastics, a point is reached above which increased amounts of the known flame-retardant compounds do not improve the flame-out property of the composition. Finally, most of the conventional halogenated flame retardant compounds, in addition to lessening the desirable properties of the base polymer, are somewhat volatile and "plate out" on the surface of the molded pieces. This problem is especially aggravated in the case of polyesters and the high ignition point thermoplastics, which ordinarily are processed at temperatures above about 200°C., at which point the conventional halogenated materials tend to ooze from the composition almost like water.

It has now been discovered that a low molecular weight halogenated polycarbonate can be made by a chain stopping reaction, e.g., by reacting phosgene or a phosgene derivative with a halogenated diphenolic compound in the presence of an organic monohydroxy compound or other monofunctional compound. Furthermore, the softening points of these low molecular weight products can be tailored to suit a particular resin system into which they are to be incorporated.

Such products can be used alone to render normally flammable thermoplastic compositions flame retardant. They may also be used in combination with synergists, such as phosphorous compounds, but particularly with inorganic or organic antimony compounds.

By way of illustration, a low molecular weight are of a carbonate of tetrabromobisphenol-A (TBBPA), chain-stopped with tribomophenol (TBP) (5:2 TBBPA:TBP) having a molecular weight of about 3,600 and a bromine content of 58 percent, and melting at 230°–260°C., is uniquely advantageous in rendering poly(ethylene terephthalate), poly(butylene terephthalate), poly(bisphenol A carbonate), and acrylonitrile-butadiene-styrene terpolymer and a polyphenylene ether-styrene resin composition flame retardant.

Such compositions, which may also contain antimony oxide, aare "self-extinguishing" and meet the stringent requirements of the Underwriters Laboratories Bulletin 94 flame test, without loss of ultimate physical properties and without plate-out of the additive or volatilization during injection molding.

Moreover, the direct combustibilities of such compositions, as measured in the Oxygen Index test of ASTM standard method D-2863 are much less than those of controls, and particularly those of controls containing conventional halogenated flame retardants.

Therefore, it is a principal object of this invention to provide a class of highly efficient, novel, low molecular weight polymers of carbonates of halogenated dihydric phenols for use as flame retardant agents.

Another object of the invention is to provide improved flame retardant polymer compositions containing such low molecular weight flame retardant additives.

Other objects and advantages of the invention will become apparent from the following detailed description.

DESCRIPTION OF THE INVENTION

According to this invention there are provided flame retardant thermoplastic compositions comprising
a. a normally flammable thermoplastic resin; and
b. a flame retardant amount of either
   i. a low molecular weight polymer of a carbonate of a halogenated dihydric phenol, said polymer containing from 2 to 10 repeating units of the formula

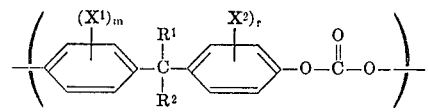

wherein $R^1$ and $R^2$ are hydrogen, (lower) alkyl or phenyl, $X^1$ and $X^2$ are bromo or chloro and $m$ and $r$ are from 1 to 4, said polymer having low volatility when heated above about 200°C., and a softening point of less than about 300°C. or ii. a combination of said polymer (i) and an inorganic or organic antimony-containing compound.

When used herein, the term "flame retardant" is used in the sense that the resistance to combustibility of the composition is significantly increased in comparison with control samples. A suitable direction measurement of combustibility is the Oxygen Index Test or LOI (Limiting Oxygen Index). This test measures a product's combustibility based on the oxygen content of the combustion atmosphere. Appropriate specimens are placed in a combustion chimney and the oxygen is reduced stepwise until the material no longer supports a flame. The LOI is defined as the percent oxygen times 100 divided by the sum of the percentages of nitrogen and oxygen in the gas used to burn the material under test. Further details of the Oxygen Index Test are found in ASTM test method D-2863. The compositions of this invention which contain flame retardant additives of the specified types in the specified amounts have a substantially higher oxygen index and thus are much less combustible than the controls.

Another useful criterion for measuring flame retardancy is to determine if the composition qualifies to be designatd "non-burning" or "self-extinguishing" by the tests set forth in Underwriters' Laboratories bulletin No. 94. In such tests if the specimens extinguish themselves within 5 to 30 seconds, after two 10-second ignitions in an open flame, flame retardancy has been established.

The term "normally flammable thermoplastic resin" includes those types generally described above, including those which ignite at relatively low and at relatively high temperatures. It is intended to exclude resins which are not normally flammable, because they inherently contain, or are modified to contain, elements, such as halogen, phosphorous, large quantities of nitrogen and the like, which render them flame retardant. Illustrative of resins which are not "normally flammable" and therefore not included as the primary resin component (a) in the compositions of the present invention are polyvinyl chloride, polytetrafluoroethylene, chlorinated polyethylene, polyesters of halogenated anhydrides, high molecular weight halogenated aromatic polycarbonates, and the like.

By way of illustration, the normally flammable thermoplastic resin can be selected from a polymerization product of a vinyl monomer, e.g., a vinyl aromatic compound, such as styrene, vinyl toluene, vinyl naphthalene, divinyl benzene, or mixtures thereof; vinyl esters, e.g., vinyl acetate or vinyl butyrate, methylene methyl malonate; a polymerization product of an olefinic monomer, such as ethylene, propylene, 1- and 2- butene, 1-decene, or a diolefin, such as butadiene or isoprene, and the like, including interpolymerization products thereof with vinyl monomers, e.g., butadiene styrene copolymers, and terpolymers with alkenyl cyanides, e.g., acrylonitrile; a polymerization product of an acrylic or methacrylic monomer, e.g., acrylic acid, methyl acrylate, ethyl acrylate, n-propyl acrylate, isopropyl acrylate, n-butyl acrylate, t-butyl acrylate, hexyl acrylate and the corresponding alkyl methacrylates; polymerization products of allyl monomers, such as methyl allyl ketone, ethyl vinyl diallyl ether, N-allyl caprolactam, N-allyl acrylamide; a polymerization product of an unsaturated ketone, e.g., methyl vinyl ketone, and the like; a polyamide, such as adipic acid-hexamethylenediamine reaction products; cellulosic esters, such as cellulose acetate, cellulose butyrate, cellulose nitrate; aromatic polycarbonates, such as phosgene-bisphenol-A reaction products; polyphenylene ethers, such as poly(2,6-dimethyl-1,4-phenylene)ether and poly(2,6-diphenyl-1,4-phenylene)ether alone and in combination with styrene resins; the polysulfones, such as polyphenylene sulfone; polybenzimidazoles; and polyesters, such as wholly aromatic polyesters, e.g., hydroquinone-terephthaloyl chloride reaction products; wholly aliphatic polyesters, and poly(alkylene iso and terephthalates), such as the highly polymerized reaction products of an ester of the corresponding phthalic acid with a glycol, such as described in U.S. Pat. Nos. 2,465,319 and 3,047,539, and elsewhere.

In especially preferred embodiments of this invention, the normally flammable thermoplastic resin component will be an aromatic polycarbonate, e.g., poly(bisphenol-A carbonate); a polyester, and particularly a poly(alkylene terephthalate, isophthalate or mixed isophthalate-terephthalate (up to 35 mol. % iso)), the alkylene groups containing from 2 to 10 carbon atoms, e.g., poly(ethylene terephthalate) or poly(1,4-butylene terephthalate); an interpolymerization product is a diene rubber, an alkenyl cyanide and a vinyl aromatic compound, e.g., a product of a butadiene or a rubbery copolymer of styrene and butadiene, interpolymerized with acrylonitrile and styrene or a polyphenylene ether alone or in combination with a styrene resin. All such resins are widely available commercially and can be prepared by procedures known by those skilled in the art.

The low molecular weight polymers of a carbonate of a halogenated dihydric phenol provided by this invention and used as flame retardant additives in the present compositions comprise a family of compounds having from 2 to 10 repeating units of the formula

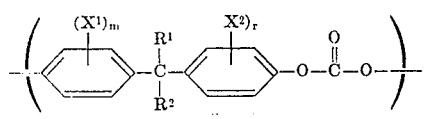

wherein $R^1$, $R^2$, $X^1$, $X^2$, $m$ and $r$ are as above defined. In addition the compounds are characterized in having a low volatility when heated above 200°C. One useful test to determine whether the compound meets this criterion is to formulate it with a relatively high melting thermoplastic, e.g., poly(bisphenol-A carbonate), or a poly(1,4-butylene terephthalate), at a temperature of at least about 200°C. and mold a workpiece from the composition. If the compound does not ooze onto the surface of the workpiece or give other evidence of vaporization at 200°C. or above, it has a low enough volatility to meet the requirement. In addition, the compounds are also characterized by having a softening point of less than about 300°C. This can be measured in any conventional way, such as on a heated melting point block. Any compound of the above general formula which softens below 300°C. and is not appreciably volatile above 200°C. is very well suited for compounding with normally flammable thermoplastic resins, and particularly those which are of the high ignition temperature type described above.

As will be clear to those skilled in the art, the softening points of the low molecular weight additives can be tailored to suit a particular resin system into which they are to be incorporated.

Furthermore, because the aromatic polycarbonates used as thermoplastic resins per se have from 100 to 400 or more repeating units, it is seen that the low molecular weight additives are substantially different, being halogenated and having only from 2 to 10 repeating units.

For any given low molecular weight polymer, it is obvious that as the average number of repeating units increases from 2 to 10, the softening point will increase and the volatility will decrease. Moreover, for any given average number of repeating units, as the nature of substituents $R^1$, $R^2$, $X^1$ and $X^2$ are varied, the softening point and volatility will vary. In addition, as will be understood by those skilled in the art, as the molecular weight and type of substitution on the terminal groups of the polymeric additives is varied, the softening point and volatility will be affected. For example, (lower) alkoxy terminal groups will provide lower softening points and somewhat higher volatility and phenoxy and substituted phenoxy, especially halogenated phenoxy groups, will raise the softening points and lower volatility.

In any event, as long as the softening point is below about 300°C. and the compound is not substantially volatile at about 200°C., it will meet the requirements set out above for a useful flame retardant additive within the scope of this invention.

The low molecular weight halogenated polycarbonate compounds of this invention can be prepared by reacting a carbonate precursor with a mixture of a halogenated dihydric phenol and a monofunctional chain stopping compound. If no chain stopping compound is present, polymerization will proceed to very long chians, e.g., with 100 to 400 or more repeating units, and a product which is not useful as component (b) will be obtained.

The carbonate precursor may be either a carbonyl halide or a haloformate. Among the carbonyl halides may be mentioned carbonyl bromide, carbonyl chloride, carbonyl fluoride, and the like. Suitable haloformates include the bischloroformate of tetrabromobisphenol-A or the chloroformate of tribromophenol together with phosgene, and the like. Carbonyl chloride, also known as phosgene, is preferred.

The halogenated dihydric phenols preferred for use preparing the compounds of ths invention will be of the formula

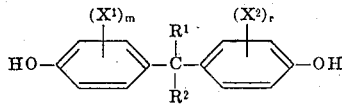

wherein $X^1$, $X^2$, $R^1$, $R^2$, $m$ and $r$ are as above defined. (Lower) alkyl means straight and branched chain alkyl groups of from 1 to 6 carbon atoms. These can be made in ways known to those skilled in the art, e.g., by the condensation of an unsubstituted or halogen substituted phenol with the corresponding ketone, see, e.g., U.S. Pat. No. 2,468,982, followed, if desired by chlorination or bromination of the aromatic rings.

Illustrative of the dihydric phenols most useful in the preparation of the compounds of this invention are: 2,2-bis-(3,5-dibromo-4-hydroxyphenyl)propane; 2,2-bis(3,5-dichloro-4-hydroxyphenyl) propane;; bis(2-bromo-4-hydroxyphenyl) methane; bis-(2,6-dibromo-4-hydroxyphenyl)methane; 1,2-bis(2,6-dibromo-4-hydroxyphenyl)ethene; 1,1-bis(2-bromo-6-chloro-4-hydroxyphenyl)-ethane; 1,1-bis(3,5-dibromo-4-hydroxyphenyl)ethane; 2,2-bis(2,6-dibromo-4-hydroxyphenyl)pentane; 3,3-bis(3,5-dibromo-4-hydroxyphenyl)hexane; bis(3,5-dibromo-4-hydroxyphenyl)phenylmethane; bis(3,5-dibromo-4-hydroxyphenyl)cyclohexylmethane; 2,2-bis(4-hydroxy-2,3,5,6-tetrabromophenyl)propane; 2,2-bis(4-hydroxy-2,3,5,6-tetrachlorphenyl)propane; and the like. Especially suitable and preferred is the commercially available compound 2,2-bis(3,5-dibromo-4-hydroxyphenyl)propane, also known as tetrabromobisphenol-A.

Those skilled in the art will realize that a wide variety of chain stopper compounds can be used in the preparation of the present compounds. In all cases, they will be monofunctional and reactive with the end groups of the repeating units. Usually the end groups will be reactive derivatives of a carbonate precursor, as defined above, so that any mono-functional compound capable of reacting with a carbonyl halide, a carbonate ester or a haloformate will suffice. Merely by way of illustration, there can be used organic monohydroxy compounds; as well as carboxylic acids or acid halides and many others. Particularly suitable are organic hydroxy compounds, such as alcohols, e.g., methanol, ethanol, decanol, and the like, and phenols. Particularly preferred as chain stopping compounds are organic phenols and especially preferred are chloro or bromo-substituted phenols. The latter chain stoppers give rise to polymeric additives according to this invention which have terminal substituents of the formulae:

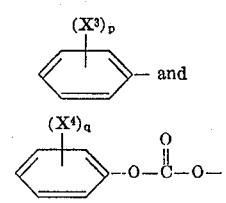

wherein $X^3$ and $X^4$ are bromo or chloro and $p$ and $q$ are each from 1 to 5. The respective phenols can be made in procedures well known to those skilled in the art. Illustrative of such phenols are 2-, 3-, 4-bromophenol and their chloro-analogs; 2,3-, 2,4-, 1,5-, 2,6-, 3,5- and 3,4-dibromophenol and their chloro-analogs, 2,3,5- and 2,4,6-tribromophenol and their chloro-analogs; 2,3,4,6- and 2,3,4,5-tetrabromophenol and their chloro-analogs; and 2,3,4,5,6-pentabromophenol and its chloro-analog. Chloro-bromo compounds can also be used. Especially suitable chain stopping compounds are the trihalogenated phenols and especially preferred is 2,4,6-tribromophenol.

The low molecular weight polymers of carbonates of halogenated dihydric phenols are prepared by reacting a carbonate precursor with a mixture of the dihydric phenol and the chain stopper, preferably in an inert solvent, and in the presence of an acid acceptor, until condensation is complete. It is necessary to use at least the stoichiometric amount of the carbonate precursor, and preferably an excess. Under such conditions, the ratio of the dihydric phenol to the monofunctional chain stopper will control the number of repeating dihydric phenol-carbonate units in the chain. If 2 moles of dihydric phenol and 2 moles of chain stopper are used, for example, the average number of repeating units, or $n$, as above defined, will be 2 and the product will have a relatively lower softening point. If, on the other hand, 10 moles of dihydric phenol and 2 moles of chain stopper are used, the average number of repeating units, $n$, will be about 10. It is preferred that the average number of repeating units, $n$, will be between 3 and 7 and especially preferred that they be of about 5. Accordingly, the molar ratio of dihydric phenol to chain stopper will preferably range from 3-7 to 2, and especially prefferably, it will be about 5 to 2. If the product comprises a poly(tetrabromobisphenol-A carbonate), chain-stopped with 2,4,6-tribromophenol, such preferred ranges of repeating units will provide very useful softening points, e.g., from 230° to 260°C. and from 230° to 240°C., respectively. Such compounds will have a high bromine content, i.e., 56–59 percent and an average molecular weight of about 3,000 to 3,500.

In one convenient manner of preparing the halogenated polymers of this invention, the halogenated dihydric phenol and the chain stopping compound, at the preselected molar ratio, are added to a well stirred solution of an amine, e.g., triethylamine or pyridine, in a solvent, such as methylene chloride. Then phosgene gas is introduced into the well stirred reaction mixture until an excess is present. A suitable temperature is about 30° to 60°C. and only a short reaction time, e.g., less than 1 hour is needed. The product is recovered, for example, by washing the reaction mixture with water, dilute acid and more water, then pouring the mixture into a large excess of a non-solvent for the polymer, e.g., methanol. The precipitated material can be recovered and dried by conventional methods. Another procedure is to carry out the reaction in a two phase aqueous organic solvent system, e.g., water-methylene chloride, in the presence of a base, such as an alkali metal hydroxide. Both such procedures will be illustrated in detail hereinafter.

As has been mentioned, it is a preferred feature of this invention to use the low molecular weight poly(halogenated dihydricphenol carbonate) in combination with a synergist. Suitable synergists include inorganic and organic antimony compounds. Such compounds are widely available or can be made in known ways. The type of antimony compound used is not critical, being a choice primarily based on economics. For example, as inorganic compounds, there can be used antimony oxide, $(Sb_2O_3)$; antimony phosphate; $KSb(OH)_6$; $NH_4SbF_6$; $SbS_3$; and the like. A wide variety of organic antimony compounds can also be used, such as antimony esters with organic acids; cyclic alkyl antimonites; aryl antimonic acids, and the like. Illustrative of the organic anitmony compounds, including inorganic salts of such compounds are: KSb tartrate; Sb caproate; $Sb(OCH_2CH_3)_3$; $Sb(OCH(CH_3)CH_2CH_3)_3$; Sb poly- methylene glycolate; triphenyl antimony; and the like. Especially preferred is antimony oxide.

The amount of low molecular weight poly(halogenated dihydric phenol carbonate) used as a flame retardant additive is not critical to the invention, so only as it is present in a minor proportion based on said compositions — major proportions are uneconomical and may detract from physical properties — but at least sufficient to render the thermoplastic resin flame retardant, non-burning or self-extinguishing, as the case may be. Those skilled in the art are well aware that the amount will vary with the nature of the flammable thermoplastic resin and the relative efficiency of the additive. In general, however, the amount of additive will be from 0.5 to 50 parts by weight of resinous component (a), with the lesser amounts providing flame retardancy, and the higher amounts being used for self-extinguishing properties. A preferred range will be from about 1.0 to 30 parts and an especially preferred range will be from about 5 to about 25 parts of additive per 100 parts of resinous component (a). Smaller amounts of compounds highly concentrated in bromine or chlorine, and especially bromine, will be sufficient, e.g., where $n$ is 2 or 3, smaller amounts will be needed than where $n$ is 7 or 8; likewise smaller amounts will be needed if the terminal groups are halogenated, especially bromine-containing. The amount of antimony compound can vary over a fairly wide range, but, in general, there is used from about 0.5 to about 20 parts by weight, expressed as antimony oxide, per 100 parts of thermoplastic resinous component (a), and preferably from about 1 to about 10 parts by weight of antimony oxide. Corresponding molar equivalent amounts of the other antimony compounds can be used. In the combinations of antimony and the poly(halogenated dihydric phenol carbonate) contemplated by the invention, the weight ratio in the combination can vary widely, but it is preferred to use from about 0.1 to 1.0 parts of antimony compound for each 1.0 part by weight of the low polymer additive component.

It is also a preferred feature of this invention to provide reinforced flame retardant thermoplastic compositions including the novel low molecular weight poly(halogenated diphenolic carbonates). In general, those skilled in the art will be able to select suitable reinforcing fillers for any particular thermoplastic resin. These can comprise, for example, whiskes, fibers or platelets of metals, e.g., aluminum, bronze, iron or nickel, and the like, and non-metals, e.g., carbon filaments, silicate particles, asbestos, $TiO_2$ and titanate whiskers; glass flakes, fibers and the like. It is to be understood that, unless the filler adds to the strength, stiffness and impact strength of the composition, it is only a filler and not a reinforcing filler as contemplated herein.

Although it is only necessary to have at least a reinforcing amount of the reinforcement present, in general the reinforcing filler will comprise from about 1 to about 80 parts by weight per 100 parts by combined weight of glass and resinous component (a).

In particular, the preferred reinforcing fillers are of glass and it is preferred to use fibrous glass filaments comprised of lime-aluminum borosilicate glass that is relatively soda-free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.00012 to 0.00075 inch, but this is not critical to the present invention.

The length of the glass filaments and whether or not they are bundled into fibers and the fibers bundled in turn into yarns, ropes or rovings, or woven into mats, and the like, are also not critical to the invention. However, in preparing the present composition, it is convenient to use the filamentous glass in the form of chopped strands of from about ⅛ inch to about 1 inch long, preferably less than ¼ inch in length. In articles molded from the compositions, on the other hand, even shorter lengths will be encountered because, during compounding, considerable fragmentation will occur.

In general, best properties will be obtained if the filamentous glass reinforcement comprises from about 1 to about 80 parts by weight based upon 100 parts of combined weight of glass and resinous component (a), and preferably from about 1 to about 50 parts by weight. Especially preferably, the glass will comprise from about 10 to about 40 parts by weight based on 100 parts of combined glass and resin.

Because it is known that reinforced compositions comprising poly(alkylene terephthalates) and glass are extremely difficult to render flame retardant, and it has now been discovered that the poly(halogenated dihydric phenol carbonate) additives are very effective to render such compositions flame retardant, it is a preferred feature of this invention to provide flame retardant polyesters reinforced with glass.

It is also regarded to be among the features of this invention to include in the compositions, other ingredients, such as fillers, mold release agents, pigments, stabilizers, nucleating agents, and the like, in conventional amounts for their conventionally employed purposes.

The manner of adding the flame retardant additives to the thermoplastic resin and, optionally, the reinforcing agent, is not critical; is conventional; and will be obvious to those skilled in the art. Preferably, however, each ingredient is added as part of a blend premix and the latter is mixed, e.g., by passage through an extruder, or by fluxing on a mill, at a temperature dependent on the needs of the particular compositions. The mixed composition can be cooled and cut up into molding granules and molded or extruded or formed into any desired shape.

It is to be understood that the compositions of ths invention can be used in many different ultimate shapes. For example, they may be molded into three-dimensional articles, or formed into films, or shaped into fibers, by conventional techniques.

DESCRIPTION OF THE PREFERRED EMBODIMENTS

The following examples illustrate the preparation of certain compounds and compositions within the scope of this invention. They are not to be construed to limit the scope of the invention in any manner whatsoever.

EXAMPLE 1

Poly(2,2-bis(3,5-dibromo-4-hydroxyphenyl)-propane-carbonate) Terminated with Tribromophenoxy Groups.

Tetrabromobis-phenol-A, 27.2 g., 0.05 moles, and 6.62 g. of tribromophenol-A, 0.02 moles, are added to a well-stirred solution of 10.5 g. of pyridine, 0.13 moles, in enough methylene chloride to give 100 ml. of total solution volume. To the reaction vessel, fitted with a reflux condenser and thermometer, 5.94 g. of phosgene gas, 0.06 moles, is introduced at the rate of 1.0 g. per min. through a dip tube below the surface of the solution. The temperature is allowed to rise to 39°C. and the methylene chloride refluxes. After addition of the phosgene is complete, stirring is maintained for about 15 minutes. The reaction solution is then washed with water, dilute HCl, and twice more with water to remove the pyridine, then poured into excess methanol to provide product as a white precipitate. The product is filtered, washed with methanol and dried to give a 90% yield of a low molecular weight brominated polycarbonate which softens at 230°C., and contains 57.2% bromine. The number of repeating units is about 5.

If methanol, phenol and 2,4,6-trichlorophenol are substituted for the tribromophenol, respectively, there are obtained the corresponding polycarbonates terminated with methoxy, phenoxy and trichlorophenoxy groups.

If 2,2-bis(3,5-dichloro-4-hydroxyphenyl)propane and 2,2-bis-(4-hydroxy-2,3,5,6-tetrabromophenyl)propane are substituted, respectively, for tetrabromobisphenol-A, the corresponding -poly(2,2-bis(3,5-dichloro-4-hydroxyphenyl)propane carbonate) and poly-(2,2-bis(4-hydroxy-2,3,5,6-tetrabromophenyl)propane carbonate) terminated with tribromophenoxy groups are obtained.

EXAMPLE 2

Poly(2,2-bis(3,5-dibromo-4-hydroxyphenyl)propane-carbonate) Terminated with Tribromophenoxy Groups.

In an alternative procedure, 136.0 g. of tetrabromobisphenol-A, 0.25 moles, and 33.1 g. of tribromophenol, 0.1 moles, are added to a well-stirred solution of 1.52 g. triethylamine, 0.015 moles, dissolved in 531 g. of methylene chloride in a 1-liter flask equipped with thermometer, reflux condenser and a pH electrode. 100 ml. of water is added and enough of a 15% solution of NaOH to provide a pH 9. Phosphene gas, 30.0 g., 0.3 moles, 3% excess, is added at a rate of 0.55 g. per minute with simultaneous dropwise addition of 15% NaOH solution in order to maintain the pH in the range of 9–10. When 95% of the theoretical amount of phosgene has been added, the pH is raised to 11.5–12.0 and the remaining phosgene is added. After addition of the phosgene, stirring is maintained for about 15 minutes. The reaction mixture is then acidified by addition of concentrated HCl solution, the aqueous phase is separated, and the organic phase is washed with dilute HCl and twice with water. The organic phase is poured into methanol and the precipitate is filtered, washed with methanol and dried to give a 95% yield of brominated low molecular weight polycarbonate which softens at 230° to 235°C., contains 57.3% bromine, and has a GPC weight average molecular weight of 3,300–3,400, i.e., about 5 repeating units in the chain.

If the molar ratio of tetrabromobisphenol-A to tribromophenol is changed from 5:2, respectively, to 2:2 and 10:2, the average number of repeating units in the polymer product is about 2 and 10, respectively.

EXAMPLE 3

In an extruder are blended 70 parts by weight of normally flammable poly(ethylene terephthalate), 30 parts by weight of ⅛inch fibrous glass reinforcement, 17.2 parts per hundred of resin of poly(2,2-bis(3,5-dibromo-4-hydroxyphenyl)propane carbonate) terminated with tribromophenoxy groups (Example 1) and 4.3 parts per hundred of resin of antimony oxide. The composition is injection molded into test pieces which are self-extinguishing within 5 seconds after two 10-second ignitions by an open flame, with no flaming dripping and a maximum of 10 sec. after glowing (SE-0, Underwriter's Bulletin 94 flame test) and the Oxygen Index is 31.0% (ASTM D-2863). There is no observable plate-out or volatilization of the additive components during processing. A glass reinforced flame retardant thermoplastic composition according to this invention is obtained.

EXAMPLE 4

In an extruder are blended 70 parts by weight of poly(1,4-butylene terephthalate), 30 parts by weight of a ⅛ inch fibrous glass reinforcement, 18.5 parts per hundred of resin of poly(2,2-bis(3,5-dibromo-4-hydroxyphenyl)propane carbonate) terminated with tribromophenoxy groups (Example 1) and 4.3 parts per hundred of resin of antimony oxide. The composition is injection molded into test pieces which are self-extinguishing within 5 seconds after two 10-second ignitions by an open flame, with no flaming dripping and a maximum of 10 seconds after glowing (SE-O, Underwriter's Bulletin 94 flame test) and the Oxygen Index is 30.0% (ASTM D-2863). There is no observable plate-out or volatilization of the additive components during processing.

EXAMPLE 5

In an extruder are blended 100 parts by weight of high molecular weight poly(bisphenol-A carbonate) and 16 parts by weight of poly(2,2-bis(3,5-dibromo-4-hydroxyphenyl)propane carbonate) terminated with tribromophenoxy groups (Example 1). The composition is injection molded into test pieces which are self-extinguishing within 5 seconds after two 10-second ignitions by an open flame with no flaming dripping and a maximum of 10 sec. after glowing (SE-O, Underwriter's Bulletin 94 flame test) and the Oxygen Index is 30.0% (ASTM D-2863).

This flame retardant composition according to this invention contains no antimony synergist.

EXAMPLE 6

In an extruder are blended 100 parts by weight of an acrylonitrile-butadiene-styrene terpolymer (ABS), 21 parts by weight of poly(2,2-bis(3,5-dibromo-4-hydroxyphenol)propane carbonate) terminated with tribromophenoxy units (Example 1) and 6 parts by weight of antimony oxide. The composition is injection molded into test pieces which are self-extinguishing within 30 seconds after two 10-second ignitions by an open flame, with no flaming dripping and a maximum of 10 sec. after-glowing (SE-O Underwriter's Bulletin 94 flame test) and the Oxygen Index is 28.0% (ASTM D-2863). There is no observable plate-out or volatilization during processing and injection molding.

EXAMPLE 7

In an extruder are blended 100 parts by weight of a composition comprising 45 parts by weight of poly(2,6-dimethyl-1,4-phenylene)ether and 55 parts by weight of rubber modified high impact polystyrene (Monsanto HT-91, polystryrene grafted polybutadiene dispersed in a polystyrene matrix and containing about 8 weight % of rubber), prepared by the teachings of Cizek, U.S. Pat. No. 3,383,435, and 21 parts by weight of poly(2,2-bis(3,5-dibromo-4-hydroxyphenyl)propane carbonate) terminated with tribromophenoxy units (Example 1) and 6 parts by weight of antimony oxide. The composition is injection molded into test pieces which are self-extinguishing within 30 seconds after two 10-second ignitions by and open flame, with no flaming dripping and a maximum of 10 sec. after-glowing (SE-O Underwriter's Bulletin 94 flame test) and the Oxygen Index is high (ASTM D-2863). There is no observable plate-out or volatilization during processing and injection molding.

Flame retardant compositions according to this invention are made if the following substitutions are made in the formulations of Examples 1–7.

For the poly(2,2-bis(3,5-dibromo-4-hydroxyphenyl)-propane carbonate) terminated with tribromophenoxy groups, substitute poly(2,2-bis(3,5-dibromo-4-hydroxyphenyl)propane carbonate) terminated, respectively with methoxy, phenoxy and trichlorophenoxy groups; or substitute poly(2,2-bis(3,5-dichloro-4-hydroxyphenyl)propane carbonate) and poly(2,2-bis(4-hydroxy-2,3,5,6-tetrabromo-4-hydroxphenyl)propane carbonate), each terminated with tribromophenoxy groups.

In the compositions of Examples 5–7, add fibrous glass reinforcement in an amount to provide 30 parts by weight of glass per 100 parts of combined weight of glass and aromatic polycarbonate. ABS resin and polyphenylene ether-styrene resin combination, respectively.

In the compositions of Examples 3, 4 and 6, for antimony oxide, substitute stoichiometrical amounts of triphenyl antimony and Sb(OCH$_2$CH$_3$)$_3$.

In the embodiments disclosed herein, the compositions comprising polyphenylene ethers or mixtures thereof with styrene resins can be made following the teachings in Hay, U.S. Pat. Nos. 3,306,874 and 3,306,875 and Cizek, U.S. Pat. No. 3,383,435. Particularly preferred compositions comprise from 25 to 75 parts by weight of a polyphenylene ether in combination with 75 to 25 parts by weight of a styrene resin. These patents are incorporated by reference.

The styrene resin is one having at least 25 percent by weight, polymer units derived from the compound having the formula:

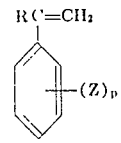

where R is hydrogen, (lower)alkyl or halogen; Z is a member selected from the class consisting of vinyl, hydrogen, chlorine and (lower)alkyl; and $p$ is a whole number equal to from 0 to 5. The term "styrene resin" as used throughout this disclosure and in the claims, and defined by the above formula includes by way of example, homopolymers such as polystyrene and polychlorostyrene, the modified polystyrenes such as rubber modified polystyrenes, and the styrene containing copolymers such as the styrene-acrylonitrile copolymers (SAN), styrene-butadiene copolymers, styrene-acrylonitrile-α-alkyl styrene copolymers, styrene-acrylonitrile-butadiene copolymers (ABS), poly-α-methylstyrene, copolymers of ethylvinylbenzene and divinylbenzene, and the like. The preferred styrene resins are the high impact polystyrenes, the ABS copolymers and the SAN copolymers.

Although the above examples have shown various modifications of the present invention, other variations are possible in the light of the above teachings. It is therefore to be understood that changes may be made in the particular embodiments of the invention described which are within the full intended scope of the invention as defined by the appended claims.

I claim:
1. A flame retardant thermoplastic composition comprising
   a. a normally flammable thermoplastic resin selected from the group consisting of
      a polymerization product of a vinyl monomer;
      a polymerization product of an olefin monomer;
      a polymerization product of an acrylic or methacrylic monomer;
      a polymerization product of an allyl monomer;
      a polyamide;
      a cellulose ester;
      an aromatic polycarbonate;
      a polyphenylene ether or a mixture thereof with a polystryrene resins; and
      a mixture of at least two of the foregoing; and
   b. a flame retardant amount of either
      i. a low molecular weight polymer of a carbonate of a halogenated dihydric phenol, said polymer containing from 2 to 10 repeating units of the formula

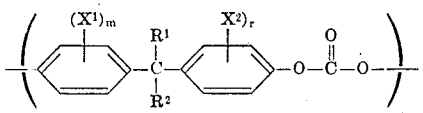

wherein $R^1$ and $R^2$ are hydrogen, (lower) alkyl, or phenyl, $X^1$ and $X^2$ are bromo or chloro and $m$ and $r$ are from 1 to 4, said lower molecular weight polymer (i) being terminated with halogenated aromatic substituents of the formulae:

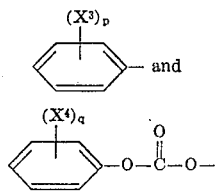

wherein $X^3$ and $X^4$ are bromo or chloro and $p$ and $q$ are each from 1 to 5, said polymer having low volatility when heated above about 200°C., and a softening point of less than about 300°C. or
      ii. a combination of said polymer (i) and an inorganic or organic antimony-containing compound.

2. A flame retardant composition as defined in claim 1 wherein said low molecular weight polymer (i) is of the formula

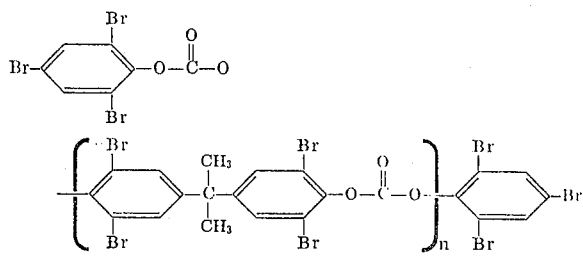

wherein the average number of repeating units, $n$, is from about 3 to about 7, and the softening point of said polymer is in the range of from 230° to 260°C.

3. A flame retardant composition as defined in claim 2 wherein said low molecular weight polymer (i) has an average number of repeating units of about 5 and the softening point of the polymer is in the range of from 230° to 240°C.

4. A flame retardant composition as defined in claim 1 wherein said aromatic polycarbonate is poly-(bisphenol-A carbonate).

5. A flame retardant thermoplastic composition comprising
   a. a normally flammable poly(bisphenol-A carbonate); and
   b. from about 5 to about 25 parts by weight of a low molecular weight polymer of the formula

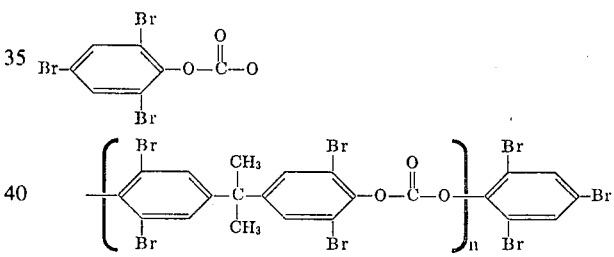

wherein $n$ is from about 3 to 7, and the softening point of said polymer is in the range of 230° to 260°C., based on 100 parts by weight of component (a).

6. A flame retardant composition as defined in claim 1 wherein said polymerization product of an allyl monomer is a polybutadiene or a rubbery copolymer of styrene and butadiene with acrylonitrile and styrene.

7. A flame retardant thermoplastic composition comprising
   a. a normally flammable interpolymerization product of a polybutadiene or a rubbery copolymer of styrene and butadiene with acrylonitrile and styrene; and
   b. from about 5 to about 25 parts by weight of a low molecular weight polymer of the formula

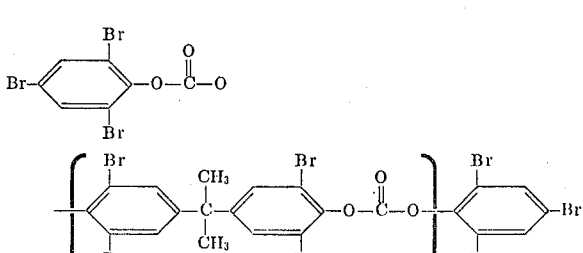

wherein n is from about 3 to 7, and the softening point of said polymer is in the range of 230° to 260°C., in combination with from about 1 to about 10 parts by weight of antimony oxide, based on 100 parts by weight of component (a).

8. A flame retardant composition as defined in claim 1 wherein said polyphenylene ether is a poly(2,6-disubstituted-1,4-phenylene) ether or a mixture thereof with a polystyrene resin.

9. A flame retardant composition comprising
a. a normally flammable poly(2,6-dimethyl-1,4-phenylene) ether or a mixture of from 25 to 75 percent by weight of said polyphenylene ether and from 75 to 25 percent by weight of a high impact rubber modified polystyrene resin; and
b. from about 5 to about 25 parts by weight of a low molecular weight polymer of the formula

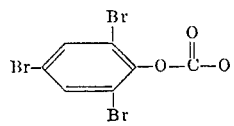

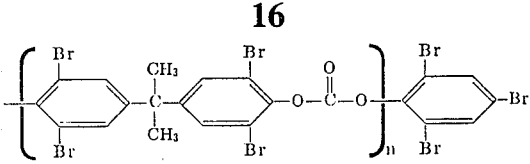

wherein n is from about 3 to 7, and the softening point of said polymer is in the range of 230 to 260°C., in combination with from about 1 to about 10 parts by weight of antimony oxide, based on 100 parts by weight of component (a).

10. A flame retardant composition comprising the low molecular weight polymer of a carbonate of a halogenated dihydric phenol as defined in claim 1 in combination with an inorganic or organic antimony-containing compound.

11. A flame retardant composition comprising the low molecular weight polymer (i) as defined in claim 2 in combination with antimony oxide.

12. A flame composition comprising the low molecular weight polymer (i) as defined in claim 3 in combination with antimony oxide.

* * * * *

PO-1050
(5/69)

UNITED STATES PATENT OFFICE
CERTIFICATE OF CORRECTION

Patent No. 3,855,277               Dated    December 17, 1974

Inventor(s)  Daniel W. Fox

It is certified that error appears in the above-identified patent and that said Letters Patent are hereby corrected as shown below:

Page 1, line 2 of the Abstract, "dihydric" is misspelled.

Column 1, lines 9 and 10, "thermoplastic" is misspelled.

Column 2, line 15, "are" should read --polymer--;

line 17, "tribromophenol" is misspelled;

line 26, "are" is misspelled.

Column 3, line 9, "direction" should read --direct--.

Column 4, line 27, "is" should read --of--.

Column 5, line 31, "about" should read --above--;

lines 39 and 40, "chains" is misspelled.

Column 6, line 57, "1,5" should read --2,5--.

Column 7, line 21, "preferably" is misspelled.

Column 8, line 6, "only" should read --long--;

line 47, "whiskers" is misspelled.

Column 9, line 49, "this" is misspelled.

Column 12, line 16, "and" should read --an--.

PO-1050
(5/69)

UNITED STATES PATENT OFFICE
CERTIFICATE OF CORRECTION

Patent No. 3,855,277             Dated   December 17, 1974

Inventor(s)  Daniel W. Fox

It is certified that error appears in the above-identified patent and that said Letters Patent are hereby corrected as shown below:

Page 2

Column 13, line 34, "resins" should read --resin--;

line 44, " $X^2)_r$ " in the formula should read --$(X^2)_r$--.

Column 14, line 24, after "is" insert --a--.

Signed and sealed this 4th day of March 1975.

(SEAL)
Attest:

RUTH C. MASON
Attesting Officer

C. MARSHALL DANN
Commissioner of Patents
and Trademarks